E. G. WHITING.
Sled-Knee.
No. 205,936. Patented July 9, 1878.
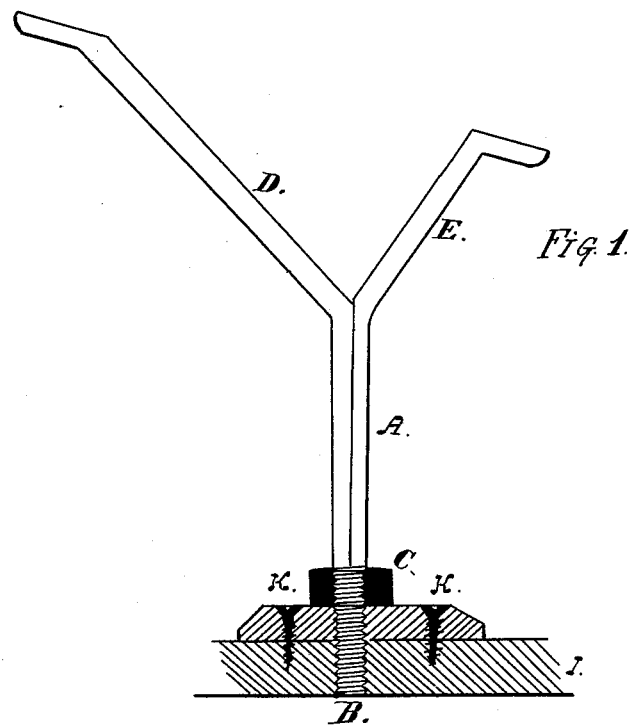
WITNESSES:
INVENTOR:

UNITED STATES PATENT OFFICE.

EBENEZER G. WHITING, OF RACINE, WISCONSIN.

IMPROVEMENT IN SLED-KNEES.

Specification forming part of Letters Patent No. 205,936, dated July 9, 1878; application filed December 3, 1877.

*To all whom it may concern:*

Be it known that I, EBENEZER G. WHITING, of Racine, in the county of Racine, in the State of Wisconsin, have invented certain Improvements in Sled-Knees, of which the following is a specification:

The object of my invention is the construction of an iron knee for sleds or sleighs, which is made by welding together two pieces of half-round iron. It has at the lower end, where the two pieces of half-round iron are welded together, making a round stock, a screw cut on the same, and a nut screwed up onto the stock, which, when the screw of the stock is screwed into the runner, the nut is turned so as to screw it down onto the runner, forming a shoulder resting firmly on the runner. The nut is provided with flanges, through which pass a couple of bolts into the runner, to keep the nut from turning. The flange on the nut is represented in the drawing by a wooden collar between the nut and the runner, which wooden collar, in practice, is to be a part of the nut.

In the drawing forming part of this specification, Figure 1 is a side view of my invention, partly in section.

A is the straight part of the knee; B, the end of the knee, with a screw cut on it, which enters the runner; C, a nut, which is on the screw part of the knee, and is screwed down onto the runner after the screw is screwed into the same. This nut has a flange on it, which is represented in the drawing by a collar under the same. This nut and collar or flange are designed to be made together and be screwed down onto the runner by a couple of bolts, K K, passing through the flange into the runner, holding the knee part to the same.

D is one of the prongs of the knee, and E the other prong. Across these two prongs the beam of the sled rests. I is a part of a sled-runner.

Having thus described my invention, what I claim as new, and desire to secure by Letters Patent, is—

A sled-knee with screw B on the bottom of the same, nut C to screw down onto the runner, forming a shoulder for the same, with straight part A, and prongs D and E, all in combination, substantially as described.

EBENEZER G. WHITING.

Witnesses:
J. B. SMITH,
J. M. FISK.